United States Patent [19]

Cameron

[11] Patent Number: 4,848,553
[45] Date of Patent: Jul. 18, 1989

[54] FRICTION LAMINATE AND DISK ASSEMBLY

[75] Inventor: Mickey G. Cameron, Auburn, Ind.

[73] Assignee: Dana Corporation, Toledo, Ohio

[21] Appl. No.: 174,670

[22] Filed: Mar. 29, 1988

[51] Int. Cl.[4] .............................................. F16D 13/60
[52] U.S. Cl. ............................ 192/107 R; 192/107 C; 188/73.1; 188/218 XL
[58] Field of Search ..................... 192/107 R, 107 C; 188/73.1, 73.2, 218 XL

[56] References Cited

U.S. PATENT DOCUMENTS

| | | | |
|---|---|---|---|
| 2,033,835 | 3/1936 | Lansing | 188/218 X |
| 3,064,782 | 11/1962 | Du Bois | 192/107 R |
| 3,194,347 | 7/1965 | Hall | 192/107 R |
| 3,412,836 | 11/1968 | Wilmer | 192/107 R |
| 3,422,936 | 1/1969 | Marcheron | 192/107 R |
| 3,433,334 | 3/1969 | Kershner | 192/107 R |
| 3,452,844 | 7/1969 | Lallemant | 192/107 R |
| 3,526,307 | 9/1970 | Falzone | 192/107 C |
| 3,746,139 | 7/1973 | Bok et al. | 192/107 R |
| 3,807,534 | 4/1974 | Eldred | 192/107 R |
| 3,857,469 | 12/1974 | Stimson | 188/218 XL |
| 3,913,716 | 10/1975 | Sedlock | 188/218 XL |
| 3,948,364 | 4/1976 | Muller | 192/107 R |
| 3,986,588 | 10/1976 | Kuzarov | 192/107 R |
| 4,013,147 | 3/1977 | Anderson | 192/107 R |
| 4,119,179 | 10/1978 | Masclet | 192/107 R |
| 4,173,681 | 11/1979 | Durrieli | 188/218 XL |
| 4,326,614 | 4/1982 | Matagrano | 192/107 R |
| 4,613,021 | 9/1986 | Lacombe et al. | 192/107 R |

Primary Examiner—Leslie A. Braun
Assistant Examiner—Andrea Pitts
Attorney, Agent, or Firm—F. B. McDonald

[57] ABSTRACT

A friction disk assembly includes a driven annular member having a plurality of radially extending torque transmitting support segments circumferentially spaced, each support segment defining an opening and supporting a friction laminate member across the opening. Each laminate includes a single backing plate which incorporates a pair of friction pads bonded to each of the opposed sides of the single backing plate. In a preferred form, the backing plate includes an offset portion which extends into the opening of an associated support segment, wherein an interference fit with the opening is established with respect to the offset portion in order to avoid relative movement between the laminate and the support segment under circumferential friction loads.

3 Claims, 1 Drawing Sheet

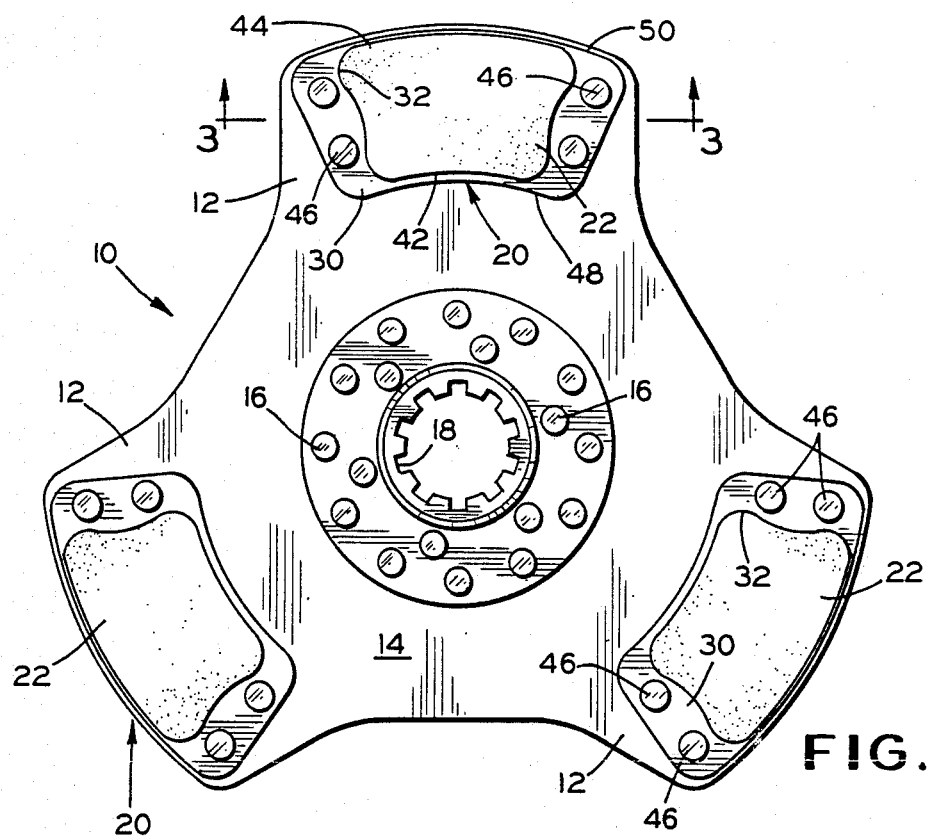
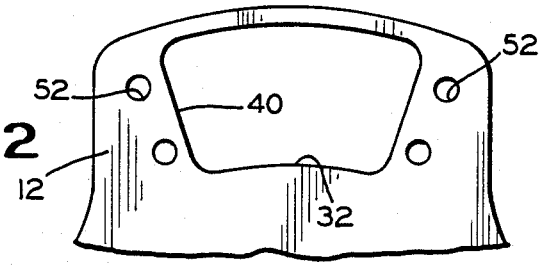
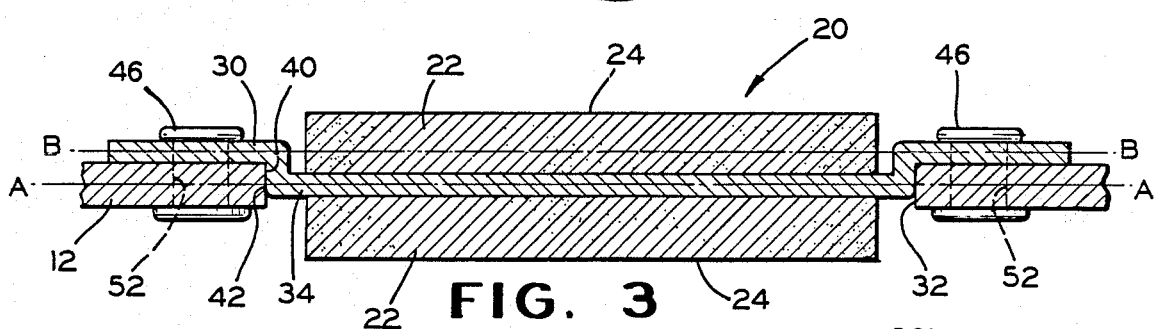
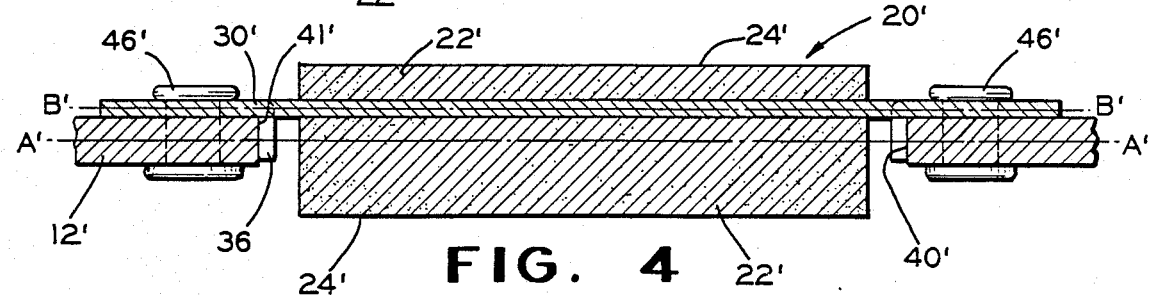

4,848,553

FRICTION LAMINATE AND DISK ASSEMBLY

BACKGROUND OF THE INVENTION

This invention relates generally to the design of friction elements utilized in driven disks of dry friction clutches. More particularly, the invention relates to the arrangement and structural characteristics of friction elements adapted for installation in such disks.

In most modern day clutch systems, modular forms of construction are employed in friction element design, wherein such elements are pre-assembled and secured by riveting to driven disk assemblies. Most opposed sets of friction elements include at least two backing plates, wherein each plate carries a single friction element. Emphases in the new modular construction processes are always on efforts to utilize fewer process steps and fewer numbers of parts, all in an effort to reduce costs. To the extent that laminations and lamination processes have been improved over the years, an improved system would provide a modular one-piece friction element wherein backing plate and friction element parts are entirely laminated together as a single unit.

SUMMARY OF THE INVENTION

The friction laminate and disk assembly of this invention includes a plurality of friction laminate members each disposed rigidly over one of a plurality of support segment openings in the assembly. Each laminate comprises a single backing plate having a pair of opposed sides, wherein one of a pair of friction pads is each bonded to one of the opposed sides of the single backing plate. In one preferred form, the single backing plate includes an offset portion which extends into the opening of an associated support segment under an interference fit with at least a portion of the boundary of the opening. In this manner, the laminate is capable of accommodating significant circumferential friction loads without undergoing relative movement with respect to the support segment. The latter measure significantly improves the load-carrying ability of the friction element over systems which rely entirely on shear load capacities of rivets employed to affix backing plates to support segments.

BRIEF DESCRIPTION OF INVENTION

FIG. 1 is a side view of a friction disk assembly which incorporates a preferred embodiment of the friction laminate of the present invention.

FIG. 2 is a fragmentary view of a friction element support segment of the clutch driven disk of FIG. 1, shown without the friction laminate incorporated therein.

FIG. 3 is a view along lines 3—3 of FIG. 1, showing a cross sectional view of a friction laminate affixed by rivets to a support segment.

FIG. 4 is an alternate embodiment of the friction laminate of the present invention, as would also be viewed along lines 3—3 in lieu of the view shown in FIG. 3.

DETAILED DESCRIPTION OF PREFERRED EMBODIMENTS

Referring initially to FIG. 1, a clutch driven disk 10 is shown apart from a friction clutch (not shown) in which it is designed to operate. The driven disk 10 includes three circumferentially spaced friction element support segments 12 which extend radially from central disk portion 14. The disk portion 14 is secured by a set of rivets 16 to a splined hub 18. The hub, in turn, is designed for coupling to a splined engine propshaft (not shown).

Each of the friction element support segments 12 contains a friction laminate or pad assembly 20, which includes a pair of opposed friction elements or pads 22. Referring momentarily to FIG. 3, each friction pad 22 includes a radially extending friction surface 24, which is parallel to an identical counterpart surface 24 on the opposite pad 22. Thus, each laminate assembly 20 contains a pair of pads 22 secured on opposite sides of a singular backing plate 30, the latter of which is affixed by rivets 46 to one of the three support segments 12. Each of the rivets 46 will pass through an aperture 52 in one of the support segments 12 for securing a friction pad assembly 20 to a particular support segment 12.

It will be appreciated by those skilled in the art that the use of a single backing plate 30 will require the inclusion of an aperture 40 (FIG. 2) for permitting the singular backing plate to contain both friction pads having opposed friction surfaces 24. Thus referring now more generally to FIG. 3, one preferred embodiment is shown wherein the backing plate 30 contains an axially or transversely offset portion 34. As will be seen from the cross-sectional end view of FIG. 3, the support segment 12 lies in a plane A—A as shown. The portion of the backing plate 30 which is secured to the support segment 12 by rivets 46, however, passes through a plane B—B parallel to that of the support segment 12. To the extent that the offset portion 34 of the backing plate 30 will, however, have its center in the same plane as that of the support segment 12, the pads 22 will have equal thicknesses as shown. In the same embodiment, it is also a feature of the present invention that the boundary 42 of the axially offset portion 34 will preferably engage, under an interference fit, the edge or boundary 32, at least in part, of the support segment aperture 40. This will assure against any relative circumferential or transverse movement between the friction laminate or pad assembly 20 and the support segment 12. Otherwise, the rivets 46 would be forced to carry all of the circumferentially applied friction loads on the assemblies 20, and over a period time rivets tend to become elongated and permit looseness.

A second preferred embodiment, shown in FIG. 4, does not have an axially offset portion 34 as does that of FIG. 3. Instead, the friction pad assembly 20' has an entirely flat backing plate which lies fully within a plane B'—B', parallel to a plane A'—A' passing through the center of the support segment 12'. In the latter embodiment, axially extending tabs 36 are utilized to engage the radial boundaries 32' of aperture 40' to provide an interference fit between the backing plate and the support segment. This form of the invention operates in the same manner as the interference fit between the boundary 42 of the offset portion 34 and the boundary 32 of the aperture 40 in the version of FIG. 3. However, it will be noted that in the latter embodiment it will be necessary to utilize a pair of friction pads 22 having differing thicknesses. As shown in FIG. 4, the lower pad 22' has a thickness which must be equal to the thickness of the upper pad plus the thickness of the support segment in order for the friction surfaces 24' to be, as is preferable, equidistant from the plane A'—A.

One preferred material for manufacture of the friction pad is a copper-base powered metal, of approximately eighty percent copper. The latter provides a superior heatsink capacity. The backing plate is preferably formed of a copper plated steel (having a plating thickness of 3 to 4 ten thousandths of an inch) to which the friction pads are sintered via the use of a copper-flux paste an adhesive bonding agent, at approximately 1700° F. In the preferred form of the invention, the tolerance range between either the support segment opening boundary 32 and the associated offset boundary 42 or the tab 36 is approximately 1 to 3 thousands of an inch maximum. This will provide an interference fit necessary to assure rigid transverse securement.

Although only two preferred embodiments have been described and detailed herein, the following claims are envisioned to cover numerous other embodiments which may fall within the spirit and scope thereof.

What is claimed is:

1. A friction disk assembly adapted for use in a friction clutch, said disk assembly comprising a driven annular member having a plurality of circumferentially and uniformly spaced torque transmitting support segments, each segment containing an opening, a friction laminate member disposed rigidly across each opening, each laminate comprising a single backing plate having a pair of opposed sides, a pair of friction pads each bonded to one of said opposed sides of said single backing plate, each pad containing an exposed friction surface, wherein said backing plate is affixed to one side of one support segment, and wherein said backing plate includes tabs which extend against the boundary of said opening in one of said segments to provide an interference fit between said laminate and said segment to avoid relative movement between said laminate and said segment under circumferentially applied friction loads, and wherein, except for said tabs, said backing plate lies entirely in a plane parallel and separate from a plane which passes through the center of said support segment.

2. The friction disk assembly of claim 1 wherein said opposed friction pads are of non-equal thicknesses, the first pad being on the side to which said backing plate is affixed and being of lessor thickness than the second pad, wherein the exposed friction surface of each pad lies within a plane substantially equidistant from said plane which passes through the center of said support segment to which said plate is affixed.

3. In a friction disk assembly adapted for use in a friction clutch, said assembly comprising a driven annular member having a plurality of radially extended torque transmitting support segments circumferentially and uniformly spaced apart, each segment defining an opening; an improvement comprising: a friction laminate member disposed rigidly across each segment opening, each laminate comprising a single backing plate having a pair of opposed sides, a pair of friction pads each bonded to one of said opposed sides of said single backing plate, wherein said backing plate of each laminate is riveted to one support segment, said backing plate of each laminate being affixed against only one side of said support segment, said backing plate defining an offset which extends into the opening of said one support segment and defining an interference fit with said opening over at least a portion of said opening, whereby each laminate may accommodate circumferentially applied friction loads without relative movement between said laminate and said support segment.

* * * * *